United States Patent
Olmeda Reino et al.

(10) Patent No.: US 11,715,281 B2
(45) Date of Patent: Aug. 1, 2023

(54) SYSTEM AND METHOD FOR DETECTING OBJECTS IN A DIGITAL IMAGE, AND SYSTEM AND METHOD FOR RESCORING OBJECT DETECTIONS

(71) Applicants: TOYOTA MOTOR EUROPE, Brussels (BE); MAX-PLANCK-GESELLSCHAFT ZUR FORDERUNG DER WISSENSCHAFTEN E.V., Munich (DE)

(72) Inventors: Daniel Olmeda Reino, Brussels (BE); Bernt Schiele, Saarbrucken (DE); Jan Hendrik Hosang, Saarbrucken (DE); Rodrigo Benenson, Dubendorf (CH)

(73) Assignees: TOYOTA MOTOR EUROPE, Brussels (BE); MAX-PLANCK-GESELLSCHAFT ZUR FORDERUNG DER WISSENSCHAFTEN E.V., Munich (DE)

( * ) Notice: Subject to any disclaimer, the term of this patent is extended or adjusted under 35 U.S.C. 154(b) by 0 days.

(21) Appl. No.: 17/562,859

(22) Filed: Dec. 27, 2021

(65) Prior Publication Data
US 2022/0129701 A1 Apr. 28, 2022

Related U.S. Application Data

(63) Continuation of application No. 16/608,399, filed as application No. PCT/EP2017/060273 on Apr. 28, 2017, now abandoned.

(51) Int. Cl.
G06V 10/25 (2022.01)
G06F 18/214 (2023.01)
(Continued)

(52) U.S. Cl.
CPC .......... G06V 10/25 (2022.01); G06F 18/214 (2023.01); G06F 18/2113 (2023.01); G06V 10/82 (2022.01)

(58) Field of Classification Search
CPC ........ G09G 3/3611; G09G 3/20; G06T 5/009; G06T 5/40
See application file for complete search history.

(56) References Cited

U.S. PATENT DOCUMENTS

| | | | |
|---|---|---|---|
| 5,214,744 A | 5/1993 | Schweizer | |
| 5,280,530 A | 1/1994 | Trew et al. | |

(Continued)

FOREIGN PATENT DOCUMENTS

| | | | |
|---|---|---|---|
| JP | 2006010652 A | 1/2006 | |
| JP | 2017049891 A | 3/2017 | |
| JP | 2017059207 A | 3/2017 | |

OTHER PUBLICATIONS

English Translation of Communication dated Dec. 1, 2020, from the Japanese Patent Office in Application No. 2019-558478.

(Continued)

*Primary Examiner* — Yosef Kassa
(74) *Attorney, Agent, or Firm* — Sughrue Mion, PLLC

(57) ABSTRACT

The invention relates to a system for detecting objects in a digital image. The system comprises a neural network which is configured to generate candidate windows indicating object locations, and to generate for each candidate window a score representing the confidence of detection. Generating the scores comprises:
  generating a latent representation for each candidate window,
  updating the latent representation of each candidate window based on the latent representation of neighboring candidate windows, and (Continued)

generating the score for each candidate window based on its updated latent representation The invention further relates to a system for rescoring object detections in a digital image and to methods of detecting objects and rescoring objects.

19 Claims, 3 Drawing Sheets

(51) Int. Cl.
*G06F 18/2113* (2023.01)
*G06V 10/82* (2022.01)

(56) References Cited

U.S. PATENT DOCUMENTS

| | | | | |
|---|---|---|---|---|
| 6,298,143 | B1 * | 10/2001 | Kikuchi | G06V 10/255 348/169 |
| 6,335,980 | B1 | 1/2002 | Armato, III | |
| 6,549,646 | B1 | 4/2003 | Yeh | |
| 7,120,292 | B2 | 10/2006 | Kunii | |
| 7,409,110 | B2 * | 8/2008 | Kayahara | G06F 16/583 707/E17.02 |
| 7,649,556 | B2 * | 1/2010 | Hayaishi | H04N 1/2112 348/222.1 |
| 7,925,072 | B2 | 4/2011 | Chen | |
| 8,340,435 | B2 | 12/2012 | Duong | |
| 8,705,889 | B2 * | 4/2014 | Murasawa | G06V 10/255 345/620 |
| 8,832,055 | B1 | 9/2014 | Zwicky | |
| 9,305,088 | B1 | 4/2016 | Zamir | |
| 9,753,949 | B1 | 9/2017 | Malpani | |

OTHER PUBLICATIONS

Felzenszwalb et al., "Object Detection with Discriminatively Trained Part Based Models", PAMI, 2010, pp. 1-20, Retrieved from URL: http://cs.brown.edu/people/pfelzens/papers/lsvm-pami.pdf.

Girshick et al. "Rich feature hierarchies for accurate object detection and semantic segmentation Tech report (v5)" CVPR, Oct. 22, 2014, pp. 1-21, Retrieved from URL: https://arxiv.org/pdf/1311.2524.

Girshick et al., "Fast R-CNN", ICCV, 2015, pp. 1-9; Retrieved from URL: https://arxiv.org/pdf/1504.08083.

Henderson et al. "End-to-end training of object class detectors for mean average precision", ACCV, 2016, pp. 1-15, Retrieved from URL: https://arxiv.org/pdf/1607.03476.

International Search Report for PCT/EP2017/060273 dated, Jan. 2, 2018 (PCT/ISA/210).

Jan Hosang et al., "A Convnet for Non-maximum Suppression", Network and Parallel Computing [Lecture Notes in Computer Science; Lect.Notes Computer], Aug. 27, 2016, pp. 192-204, XP047353657, Springer International Publishing.

Jan Hosang et al., "Learning non-maximum suppression", May 9, 2017, 16 pgs., XP55435200, Retrieved from the Internet: URL:https://arxiv.org/pdf/1705.02950.pdf.

Jan Hosang, "GitHub Hosang/Gossipnet", Feb. 13, 2017, 73 pgs., XP055435463, Retrieved from the Internet: URL:https://github.com/hosang/gossipnet/tree/ce8ea8d4aa7fadcd749a0ebd290bl574d348cd9d.

Liu et al., "SSD: Single Shot MultiBox Detector", ECCV, Dec. 29, 2016, pp. 1-17, Retrieved from URL: https://arxiv.org/pdf/1512.02325.

Matthew B. Blaschko et al., "Non Maximal Suppression in Cascaded Ranking Models", Image Analysis, Jun. 17, 2013, pp. 408-419, XP047030599, Springer Berlin Heidelberg.

Rasmus Rothe et al., "Non-Maximum Suppression for Object Detection by Passing Messages between Windows", Jan. 1, 2014, XP55435204, Retrieved from the Internet:URL:http://e-collection.library.ethz.ch/eserv/eth:46736/eth-46736-01 pdf.

Redmon et al., "You Only Look Once: Unified, Real-Time Object Detection", CVPR, May 9, 2016, pp. 1-10, Retrieved from URL: https://arxiv.org/pdf/1506.02640.

Ren et al., "Faster R-CNN: Towards Real-Time Object Detection with Region Proposal Networks", NIPS, 2015, pp. 1-9, Relieved from URL: https://papers.nips.cc/paper/5638-faster-r-cnn-towards-real-time-object-detection-with-region-proposal-networks.pdf.

Sitapa Rujikietgumjorn et al., "Optimized Pedestrian Detection for Multiple and Occluded People," 2013 IEEE Computer Society Conference on Computer Vision and Pattern Recognition Proceedings, IEEE Computer Society, Jun. 23, 2013, pp. 3690-3697, XP032493190.

Wan et al. "End-to-End Integration of a Convolutional Network, Deformable Parts Model and Non-Maximum Suppression", CVPR, Computer Vision Foundation, 2015, pp. 851-859, Retrieved from URL: https://www.cv-foundation.org/openaccess/content_cvpr_2015/papers/Wan_End-to-End_Integration_of_2015_CVPR_paper.pdf.

Written Opinion of the International Searching Authority for PCT/EP2017/060273 dated, Jan. 2, 2018 (PCT/ISA/237).

\* cited by examiner

SYSTEM AND METHOD FOR DETECTING OBJECTS IN A DIGITAL IMAGE, AND SYSTEM AND METHOD FOR RESCORING OBJECT DETECTIONS

CROSS REFERENCE TO RELATED APPLICATIONS

This application is a continuation of U.S. application Ser. No. 16/608,399 filed Oct. 25, 2019 (allowed), which is a National Stage of International Application No. PCT/EP2017/060273 filed Apr. 28, 2017. The entire disclosures of the prior applications are considered part of the disclosure of the accompanying continuation application, and are hereby incorporated by reference.

FIELD OF THE DISCLOSURE

The present disclosure is related to a system and a method for detecting objects in a digital image, and a system and a method for rescoring object detections.

BACKGROUND OF THE DISCLOSURE

Modern object detectors follow a three step recipe: (1) proposing a search space of windows (exhaustive by sliding window or sparser using proposals), (2) scoring/refining the window with a classifier/regressor, and (3) merging windows that might belong to the same object. This last stage is commonly referred to as "non-maximum suppression" (NMS), cf. e.g.:

R. Girshick. Fast R-CNN. In ICCV, 2015,

P. Felzenszwalb, R. Girshick, D. McAllester, and D. Ramanan. Object detection with discriminatively trained part-based models. PAMI, 2010, and W. Liu, D. Anguelov, D. Erhan, C. Szegedy, and S. Reed. Ssd: Single shot multibox detector. In ECCV, 2016, L. Wan, D. Eigen, and R. Fergus. End-to-end integration of a convolutional network, deformable parts model and non-maximum suppression. In CVPR, 2015, P. Henderson and V. Ferrari. End-to-end training of object class detectors for mean average precision. In ACCV, 2016.

The de facto standard for such conventional NMS is a simple hand-crafted test time post-processing. The algorithm greedily selects high scoring detections and deletes close-by less confident neighbours since they are likely to cover the same object. This algorithm is simple, fast, and competitive compared to proposed alternatives.

The most notable recent performance breakthrough in general object detection was marked by R-CNN, which effectively replaced features extraction and classifiers by a neural network, almost doubling performance on Pascal VOC, cf.

R. Girshick, J. Donahue, T. Darrell, and J. Malik. Rich feature hierarchies for accurate object detection and semantic segmentation. In CVPR, 2014.

Another significant improvement was to absorb the object proposal generation into the network, cf. e.g.:

S. Ren, K. He, R. Girshick, and J. Sun. Faster RCNN: Towards real-time object detection with region proposal networks. In NIPS, 2015.

Meanwhile, other works avoid proposals altogether, leading to both speed and quality improvements, cf. e.g.:

J. Redmon, S. Diwala, R. Girshick, and A. Farhadi. You only look once: Unified, real-time object detection. In CVPR, 2016.

There is a general trend towards end-to-end learning and it seems reasonable to expect further improvements by doing complete end-to-end training of detectors. NMS is one step in the pipeline that, for the most part, has evaded the end-to-end learning paradigm. All of the above detectors train the classifier in a procedure that ignores the fact that the NMS problem exists and then runs a conventional NMS as a disconnected postprocessing.

There is a need to overcome conventional NMS due to its significant conceptual shortcomings. Conventional NMS makes hard decision by deleting detections and bases this decision on one fixed parameter that controls how wide the suppression is. A wide suppression would remove close-by high scoring detections that are likely to be false positives that hurt precision. On the other hand, if objects are close (e.g. in crowded scenes), close-by detections can be true positives, in which case suppression should be narrow to improve recall. When objects are close-by, conventional NMS is doomed to sacrifice precision or recall independent of its parameter.

There has further been an approach to combine decisions of a conventional NMS with different overlap thresholds, allowing the network to choose the conventional NMS operating point locally, cf:

J Hosang, R. Benenson, and B. Schiele. A convent for non-maximum suppression. In GCPR, 2016.

SUMMARY OF THE DISCLOSURE

Currently, it remains desirable to provide a system, rescoring system and method comprising a neural network which renders the need for conventional NMS post-processing superfluous.

Therefore, according to the embodiments of the present disclosure, it is provided a system for detecting objects in a digital image. The system comprises a neural network being configured to generate candidate windows indicating object locations, and to generate for each candidate window a score representing the confidence of detection. Generating the scores (i.e. a score for each candidate window) comprises:

generating a latent representation for each candidate window, updating the latent representation of each candidate window based on the latent representation of neighboring candidate windows, and generating the score for each candidate window based on its updated latent representation.

Said neighboring candidate windows are referring desirably to the neighbors of the candidate window, whose latent representation is updated.

Accordingly, the rescoring system is desirably configured to recognize multi detections by processing each object detection (i.e. generating the latent representation of each candidate window) together with its neighboring detections (i.e. by updating each candidate window's representation, thereby considering the latent representations of the neighboring candidate windows of the currently updated candidate window). As a result, those object detections which are recognized to be multi detections of the same object are desirably suppressed such that only one object detection remains (i.e. has a high score in relation to the its neighboring candidate windows).

By providing such a system it becomes possible that the neural network learns NMS to overcome the limitations of a conventional NMS prost-processing step. An NMS approach based on a neural network can learn to adapt to the data distribution, overcome the tradeoff of conventional NMS, and importantly can be incorporated into a detector.

A latent representation may be a multi-dimensional feature vector. For example, latent representation may be determined based on the candidate window, and in particular image content in the candidate window. An example would be to take the image content in the window and process it by at least one (or e.g. three) layer of the neural network, in order to obtain the latent representation/feature vector. In a specific example the at least one layer consists of at least one of a convolution, a pooling, and/or a FC (fully connected) layer.

The latent representations may be updated such that the resulting scores of the candidate windows are changed.

Desirably, this change is such that one candidate window of a detected object increases its score, while all other candidate windows on the same object decrease their score. The amount of increase and/or decrease may be e.g. a learned amount that is deduced from the latent representations.

Updating the latent representation of a candidate window may be performed by considering pairs of neighboring candidate windows. A pair of neighboring candidate windows may comprise said candidate window and one of its neighboring candidate windows.

The neighboring candidate windows may comprise all windows overlapping to a predetermined extent with the candidate window, of which the latent representation is updated.

The neural network may comprise a repeating structure for updating the latent representation of each candidate window based on the latent representation of neighboring candidate windows.

Updating the latent representation of a candidate window may comprise forming with each of its neighboring candidate windows a pair of detections. The pair of detections may include the latent representations of said candidate window and said neighboring window. The pair of detections may be a pair feature vector.

Said pair feature vector may have equal or different dimensions as the feature vector of a latent representation. Generally, after every FC layer the dimensions may be freely selectable.

Updating the latent representation of a candidate window may further comprise determining detection pair features based on the two candidate windows, for example, the geometry of the candidate windows.

The detection pair features of the pair of candidate windows may be concatenated to the pair feature vector.

The pair feature vector, to which the detection pair features are concatenated, may be mapped independently through fully connected layers.

The number of pair feature vectors corresponding to the variable number of neighboring candidate windows may be reduced to a fixed-size representation by pooling. For example; the pair feature vectors may be reduced with an elementwise operation to one n-dimensional pooling feature vector.

Said pooling feature vector may have equal or different dimensions as the feature vector of a latent representation and/or as the pair feature vector.

Desirably the multiple (k) pair feature vectors of n dimensions are reduced to one n-dimensional pooling feature vector.

The dimensionalities of the latent representations of candidate windows may be reduced before being combined into the pair feature vector.

Accordingly, memory usage and/or computational cost can be reduced.

Alternatively or additionally, after the pooling operation the dimensionalities may be increased to match the size of the latent representations of candidate windows.

A candidate window may comprise a rectangular frame and/or a pixelwise mask of a detected object.

The neural network may be trained by using at least one digital training image as a ground truth having a plurality of objects and respective object annotations indicating the actual locations of the objects. The training may comprise:
generating candidate windows indicating object locations,
for each candidate window generating a score representing the confidence of detection, and
associating each object annotation to the best matching candidate window based on the score of the candidate windows and the overlap between the object annotation and the candidate windows, so that each candidate window is associated to maximally one object annotation and so that each object annotation is associated to maximally one candidate window.

Accordingly, a matching (association) between unique couples of object annotations and candidate windows can be determined, so that none of the object annotations or the candidate window is matched (associated) twice.

This matching may be obtained e.g. by:
forming a list comprising the candidate windows, wherein the candidate windows are sorted in descending order by their confidence,
identifying an unmatched object annotation having the highest overlap with the first one of the candidate windows in the list (i.e. having the highest confidence in the list),
removing said candidate window from the list, and
matching said candidate window to said object annotation, in case the overlap exceeds a predetermined threshold.

The neural network may be trained by using successfully matched detections as positive training examples, and unmatched detections as negative training examples.

The invention further relates to a system for rescoring object detections in a digital image. An object detection comprises a candidate window indicating the object location and a score representing the confidence of detection. The system comprises a neural network being configured to:
generate a latent representation for each object detection,
update the latent representation of each object detection based on the latent representation of neighboring object detections, and
generate the new score for each object detection based on its updated latent representation.

By providing such a system it becomes possible that the neural network learns NMS to overcome the limitations of a conventional NMS prost-processing step. An NMS approach based on a neural network can learn to adapt to the data distribution, overcome the tradeoff of conventional NMS.

Furthermore, by providing such a system the present disclosure proposes a "pure NMS network" which is able to do the task of non-maximum suppression without image content or access to decisions of another algorithm.

Said system for rescoring object detections may be a part (or a sub-system) of the system for detecting objects in a digital image, as described above. In other words, the system for detecting objects may comprise the system for rescoring object detections.

For example, the system for detecting objects in a digital image may comprise a neural network being configured to generate candidate windows indicating object locations, and for each candidate window generate a score representing the confidence of detection, wherein said neural system may further comprise said system for rescoring object detections, as described above.

Alternatively, the system for detecting objects may comprise a first neural network being configured to generate candidate windows indicating object locations, and for each candidate window generate a score representing the confidence of detection. Further, the system for detecting objects may comprise a second neural system constituting the system for rescoring object detections.

Desirably, this change is such that one candidate window of a detected object increases its score, while all other candidate windows on the same object decrease their score. The amount of increase and/or decrease may be e.g. a learned amount that is deduced from the latent representations.

Updating the latent representation of a candidate window may be performed by considering pairs of neighboring candidate windows. A pair of neighboring candidate windows may comprise said candidate window and one of its neighboring candidate windows.

The neighboring candidate windows may comprise all windows overlapping to a predetermined extent with the candidate window, of which the latent representation is updated.

The neural network may comprise a repeating structure for updating the latent representation of each candidate window based on the latent representation of neighboring candidate windows.

Updating the latent representation of a candidate window may comprise forming with each of its neighboring candidate windows a pair of detections. The pair of detections may include the latent representations of said candidate window and said neighboring window. The pair of detections may be a pair feature vector.

Updating the latent representation of a candidate window may further comprise determining detection pair features based on the two candidate windows, for example, the geometry of the candidate windows.

The detection pair features of the pair of candidate windows may be concatenated to the pair feature vector.

The pair feature vector, to which the detection pair features are concatenated, may be mapped independently through fully connected layers.

The number of pair feature vectors corresponding to the variable number of neighboring candidate windows may be reduced to a fixed-size representation by pooling. For example; the pair feature vectors may be reduced with an elementwise operation to one n-dimensional pooling feature vector.

The dimensionalities of the latent representations of candidate windows may be reduced before being combined into the pair feature vector.

Alternatively or additionally, after the pooling operation the dimensionalities may be increased to match the size of the latent representations of candidate windows.

A candidate window may comprise a rectangular frame and/or a pixelwise mask of a detected object.

The neural network may be trained by using at least one digital training image as a ground truth having a plurality of objects and respective object annotations indicating the actual locations of the objects. The training may comprise:
generating candidate windows indicating object locations,
for each candidate window generating a score representing the confidence of detection, and
associating each object annotation to the best matching candidate window based on the score of the candidate windows and the overlap between the object annotation and the candidate windows, so that each candidate window is associating to maximally one object annotation.

The neural network may be trained by using successfully matched detections as positive training examples, and unmatched detections as negative training examples.

The present disclosure further relates to a method of detecting objects in a digital image. In the method a neural network performs the steps of:
generating candidate windows indicating object locations, and
for each candidate window generating a score representing the confidence of detection,
The step of generating the scores comprises:
generating a latent representation for each candidate window,
updating the latent representation of each candidate window based on the latent representation of neighboring candidate windows, and
generating the score for each candidate window based on its updated latent representation.

The method may comprise further method steps which correspond to the functions of the system for detecting objects in a digital image, as described above. The further desirable method steps are described in the following.

The present disclosure further relates to a method of rescoring object detections in a digital image. An object detection comprises a candidate window indicating the object location and a score representing the confidence of detection. In the method a neural network performs the steps of:
generating a latent representation for each object detection,
updating the latent representation of each object detection based on the latent representation of neighboring object detections, and
generating the new score for each object detection based on its updated latent representation.

The method may comprise further method steps which correspond to the functions of the system for rescoring object detections in a digital image, as described above. The further desirable method steps are described in the following.

The present disclosure further relates to a computer program comprising instructions for executing the steps of the method of detecting objects in a digital image, when the program is executed by a computer.

Finally, the present disclosure further relates to a computer program comprising instructions for executing the steps of the method of rescoring object detections in a digital, when the program is executed by a computer.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, and serve to explain the principles thereof.

DESCRIPTION OF THE EMBODIMENTS

Reference will now be made in detail to exemplary embodiments of the disclosure, examples of which are illustrated in the accompanying drawings. Wherever possible, the same reference numbers will be used throughout the drawings to refer to the same or like parts.

Figure 1:
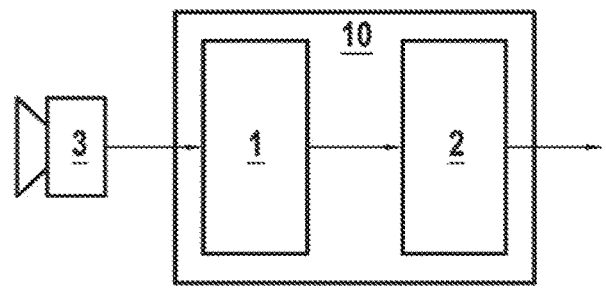
FIG. 1 shows a block diagram of a system with a detector and a rescoring system according to embodiments of the present disclosure.

FIG. 1 shows a block diagram of a system 10 with an object detector 1 and a rescoring system 2 (i.e. a system for rescoring object detections) according to embodiments of the present disclosure. The system may have various further functions, e.g. may be a robotic system or a camera system. It may further be integrated in a vehicle.

The system 10 may comprise an electronic circuit, a processor (shared, dedicated, or group), a combinational logic circuit, a memory that executes one or more software programs, and/or other suitable components that provide the described functionality. In other words, system 10 may be a computer device. The system may be connected to a memory, which may store data, e.g. a computer program which when executed, carries out the method according to the present disclosure. In particular, the system or the memory may store software which comprises the neural network according to the present disclosure.

The system 10, in particular the detector 1, has an input for receiving a digital image or a stream of digital images. In particular, the system 10, in particular the detector 1, may be connected to an optical sensor 3, in particular a digital camera. The digital camera 3 is configured such that it can record a scene, and in particular output digital data to the system 10, in particular the detector 1.

The detector 1 may be implemented as software running on the system 10 or as a hardware element of the system 10. The detector 1 carries out a computer vision algorithm for detecting the presence and location of objects in a sensed scene. For example, vehicles, persons, and other objects may be detected. The detector outputs candidate windows indicating object locations and generates for each candidate window a score representing the confidence of detection.

Furthermore, also the rescoring system 2 may be implemented as a software running on the system 10 or as a hardware element of the system 10. In particular, the system may comprise a neural network which includes both the detector and the rescoring system. Alternatively the rescoring system may be realized as an independent neural network (in particular beside a neural network comprising the detector).

The rescoring system 2 receives as an input from the detector the detection results. In particular it receives information regarding one or more object detections. Each object detection comprises a candidate window indicating the object location and a score representing the confidence of detection. The rescoring system rescores these objects detections such that double detections are suppressed. In detail, the rescoring system generates a latent representation for each candidate window. The latent representation of each candidate window is subsequently updated based on the latent representation of neighboring candidate windows. The (thus re-evaluated) score for each candidate window is then generated based on its updated latent representation.

By this, the rescoring system is configured to recognize double detections by processing each object detection together with its neighboring detections. Those object detections which are recognized to be multi detections of the same object are suppressed such that only one object detection remains.

In the following the operation of the neural network according to the present disclosure is explained in more detail and with reference to FIGS. 2 to 4b.

Present-day detectors do not return all detections that have been scored, but instead use NMS as a post-processing step to remove redundant detections. In order to have true end-to-end learned detectors, the present disclosure relates to detectors without any post-processing. To understand why NMS is necessary, it is useful to look at the task of detection and how it is evaluated.

The task of object detection is to map an image to a set of boxes (i.e. candidate windows): one box per object of interest in the image, each box tightly enclosing an object. This means detectors ought to return exactly one detection per object. Since uncertainty is an inherent part of the detection process, evaluations allow detections to be associated to a confidence. Confident erroneous detections are penalized more than less confident ones. In particular mistakes that are less confident than the least confident correct detection are not penalized at all.

The detection problem can be interpreted as a classification problem that estimates probabilities of object classes being present for every possible detection in an image. This viewpoint gives rise to "hypothesize and score" detectors that build a search space of detections (e.g. sliding window, proposals) and estimate class probabilities independently for each detection. As a result, two strongly overlapping windows covering the same object will both result in high score since they look at almost identical image content. In general, instead of one detection per object, each object triggers several detections of varying confidence, depending on how well the detection windows cover the object.

Since the actual goal is to generate exactly one detection per object (or exactly one high confidence detection), a common practice (since at least 1994) is to assume that highly overlapping detections belong to the same object and collapse them into one detection. The predominant algorithm (conventional NMS) accepts the highest scoring detection, then rejects all detections that overlap more than some threshold and repeats the procedure with the remaining detections, i.e. greedily accepting local maxima and discarding their neighbours, hence the name. This algorithm eventually also accepts wrong detections, which is no problem if their confidence is lower than the confidence of correct detections.

This conventional NMS algorithm works well if (1) the suppression is wide enough to always suppress high scoring detections triggered by same object and (2) the suppression is narrow enough to never suppress high scoring detections of the next closest object. If objects are far apart condition (2) is easy to satisfy and a wide suppression works well. In crowded scenes with high occlusion between objects there is a tension between wide and narrow suppression. In other words with one object per image NMS is trivial, but highly occluded objects require a better NMS algorithm.

The present disclosure is based on these requirements to an NMS algorithm but proposes a solution where the NMS is a "pure NMS network", in particular it can be incorporated into a detector.

Independent processing of image windows leads to overlapping detection giving similar scores, this is a requirement of robust functions: similar inputs lead to similar outputs. A detector that outputs only one high scoring detection per object thus has to be also conditioned on other detections: multiple detections on the same object should be processed jointly, so the detector can tell there are repeated detections and only one of them should receive a high score.

Typical inference of detectors consist of a classifier that discriminates between image content that contains an object and image content that does not. The positive and negative training examples for this detector are usually defined by some measure of overlap between objects and bounding boxes. Since similar boxes will produce similar confidences anyway, small perturbation of object locations can be considered positive examples, too. This technique augments the training data and leads to more robust detectors. Using this type of classifier training does not reward one high scoring detection per object, and instead deliberately encourages multiple high scoring detections per object.

From this analysis there result two key ingredients for the system of the present disclosure, in order for a detector to generate exactly one detection per object:

1. A loss that penalises double detections to teach the detector, as precisely one detection per object is required.
2. Joint processing of neighbouring detections so the detector has the necessary information to tell whether an object was detected multiple times.

The neural network design according to the present disclosure accommodates both ingredients. The neural network design avoids hard decisions and does not discard detections to produce a smaller set of detections. Instead, NMS is reformulated as a rescoring task that seeks to decrease the score of detections that cover objects that already have been detected. After rescoring, simple thresholding may be done to reduce the set of detections. For evaluation the full set of rescored detections may be passed to the evaluation script without any post processing.

Loss:

A detector is supposed to output exactly one high scoring detection per object. The loss for such a detector must inhibit multiple detections of the same object, irrespective of how close these detections are.

The detector may be judged by the evaluation criterion of a benchmark, which in turn defines a matching strategy to decide which detections are correct or wrong. This is the matching that should be used at training time. Typically benchmarks sort detections in descending order by their confidence and match detections in this order to objects, preferring most overlapping objects. Since already matched objects cannot be matched again surplus detections are counted as false positives that decrease the precision of the detector. This matching strategy may be used for training.

The result of the matching may be used as labels for the classifier: successfully matched detections are positive training examples, while unmatched detections are negative training examples for a standard binary loss. Typically all detections that are used for training of a classifier have a label associated as they are fed into the network. In this case the network has access to detections and object annotations and the matching layer generates labels, that depend on the predictions of the network. This class assignment directly encourages the rescoring behaviour that is desired to be achieved.

Let di denote a detection, yi (as element of [−1, 1]) indicate whether or not di was successfully matched to an object, and let f denote the scoring function that jointly scores all detections on an image $$f([d_i]_{i=1}^n)=[s_i]_{i=1}^n.$$

It is trained with weighted loss $$L(s_i, y_i) = \sum_{i=1}^{N} w_{y_i} \cdot \log(1 + \exp(-s_i \cdot y_i)).$$

Here loss per detection is coupled to the other detections through the matching that produces yi. The weighting wyi is used to counteract the extreme class imbalance of the detection task. The weights may be chosen so the expected class conditional weight of an example equals a parameter $$E(w_1 I(y_i=1))=\gamma.$$

When generalising to the multiclass setting, detections are associated to both a confidence and a class. Since only detections are rescored, detections are allowed to be "switched off" but not to change their class. As a result, only detections are matched to objects of the same class, but the classification problem remains binary and the above loss still applies. When representing the detection scores, a one-hot encoding may be used: a zero vector that only contains the score at the location in the vector that corresponds to the class. Since mAP computation does not weight classes by their size, the instance weights may be assigned in a way that their expected class conditional weight is uniformly distributed.

Joint Processing:

In order to effectively minimize the aforementioned loss, it is necessary for the neural network to jointly process detections. To this end a neural network is designed with a repeating structure, which is called "blocks" (shown in FIG. 3). One block gives each detection access to the representation of its neighbours and subsequently updates its own representation. Stacking multiple blocks means the network alternates between allowing every detection "talk" to its neighbours and updating its own representation. In other words, detections talk to their neighbours to update their representation.

Figure 2:
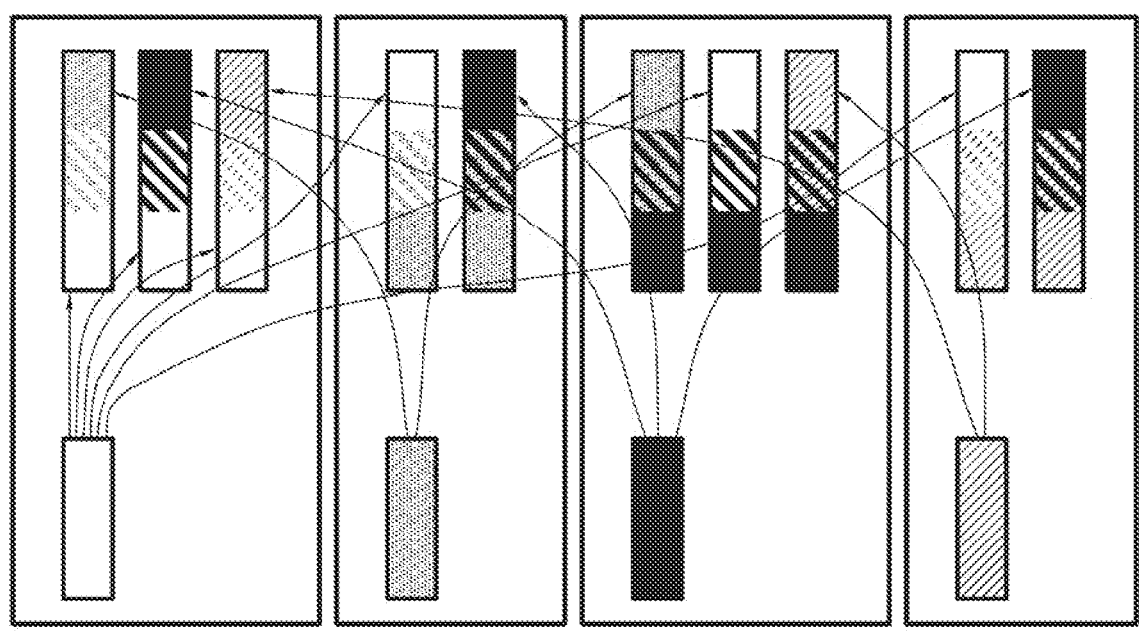
FIG. 2 shows a schematic diagram of how detection features are combined into a pairwise context according to embodiments of the present disclosure.
Figure 2:
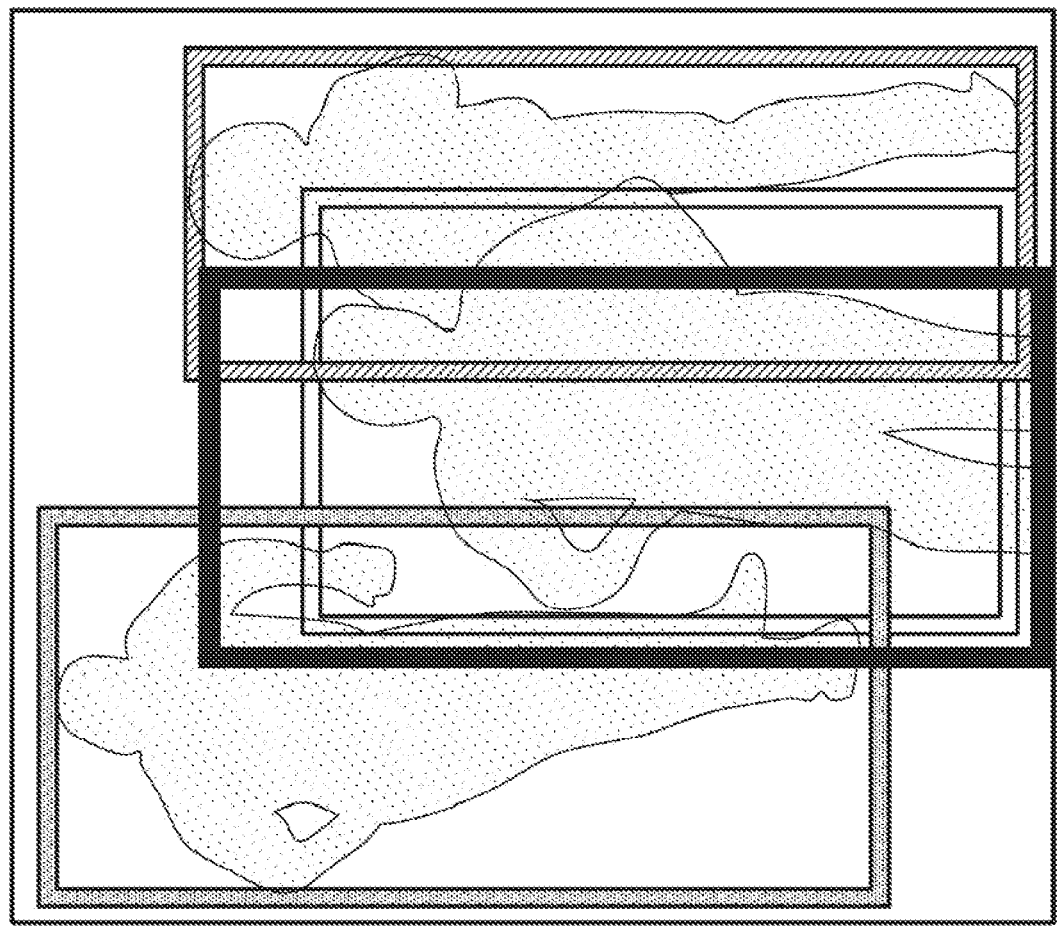

There are two non-standard operations here that are key. The first is a layer, that builds representations for pairs of detections, as shown in FIG. 2. This leads to the key problem: an irregular number of neighbours for each detection. Since it is desired to avoid a discretisation scheme, this issue is desirably solved with pooling across detections (the second key).

Figure 4A:
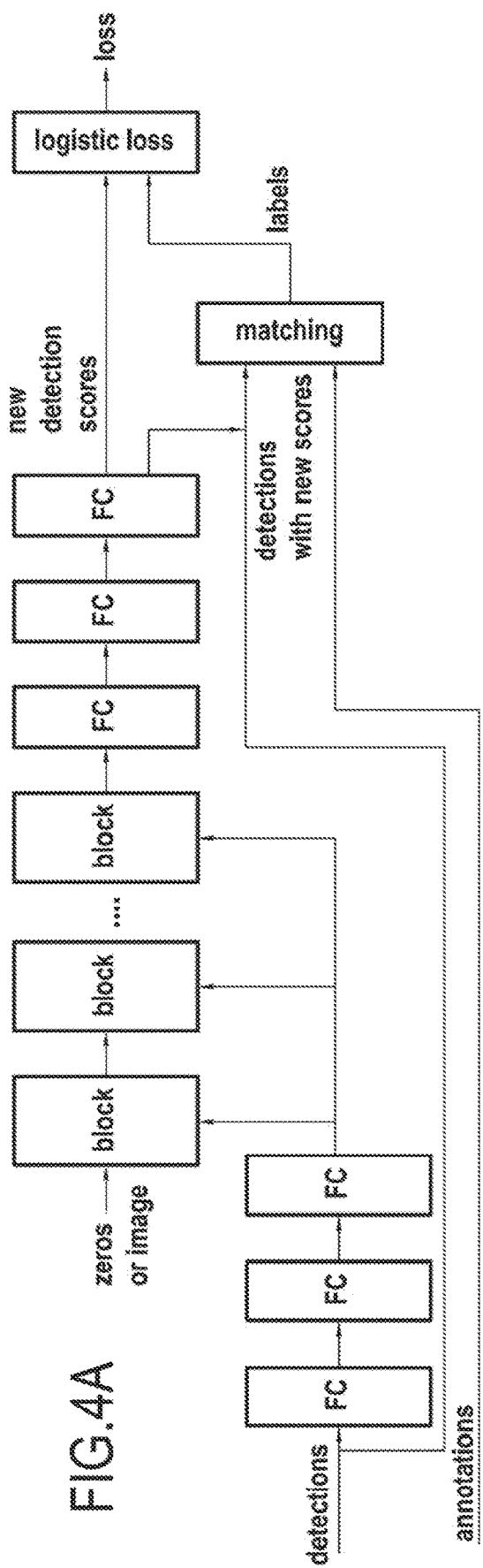
FIG. 4a shows a schematic flow chart illustrating a training architecture of the neural network according to embodiments of the present disclosure.
Figure 4B:
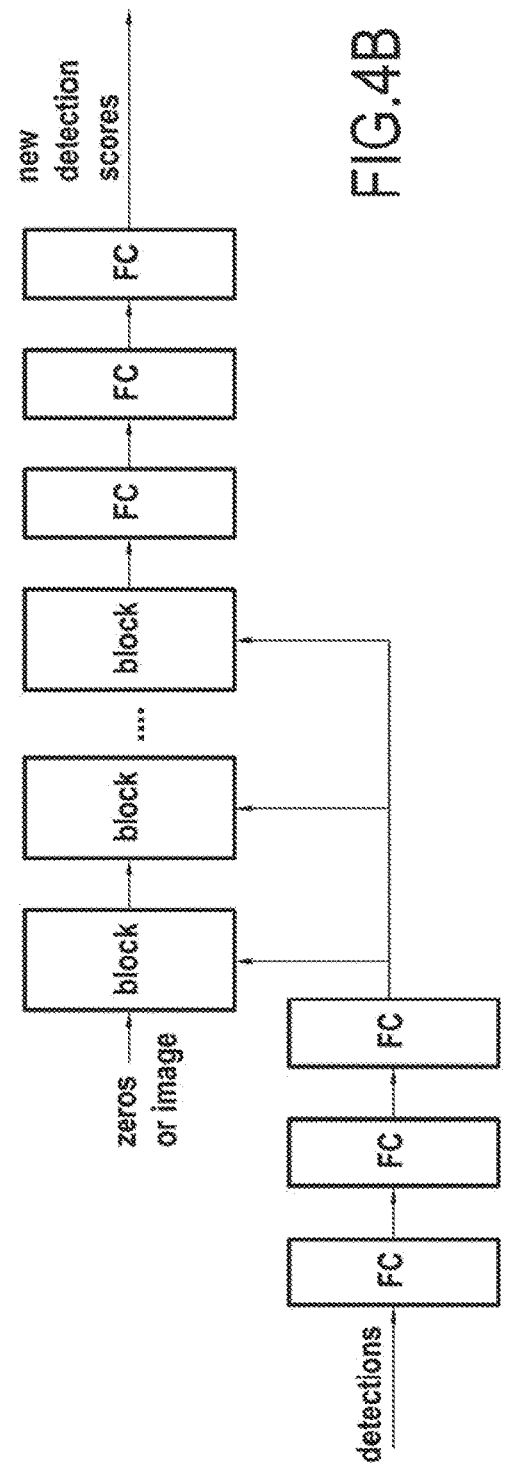
FIG. 4b shows a schematic flow chart illustrating a test architecture of the neural network according to embodiments of the present disclosure.

Detection Features:

The blocks of the neural network take the detection feature vector of each detection as input and outputs an updated vector (see high-level illustration in FIG. 4a, 4b). Outputs from one block are input to the next one. The values inside this c=128 dimensional feature vector are learned implicitly during the training. The output of the last block is used to generate the new detection score for each detection.

The first block takes an all-zero vector as input. The detections' information is fed into the network in the "pairwise computations" section of FIG. 3 as described below. This zero input could potentially be replaced with image features.

Pairwise Detection Context:

The first is a layer that builds representations for pairs of detections, as shown in FIG. 2. FIG. 2 shows a schematic diagram of how detection features are combined into a pairwise context according to embodiments of the present disclosure. Each solid block is the feature vector of the detection of corresponding pattern (e.g. different dashed lines). The hatched blocks are the "detection pair features" that are defined by the two detections corresponding to the two patterns.

Each mini-batch consists of all n detections on an image, each represented by a c dimensional feature vector, so the data has size n×c and accessing to another detection's representations means operating within the batch elements. A detection context layer is used, that, for every detection di, generates all pairs of detections (di; dj) for which dj sufficiently overlaps with di (IoU>0.2). The representation of a pair of detections consists of the concatenation of both detection representations and g dimensional detection pair features (see below), which yields an I=2c+g dimensional feature. To process each pair of detections independently, the features are arranged of all pairs of detections along the batch dimension: if detection di has ki neighbouring detection that yields a batch of size K×I, where $$K=\Sigma_{i=1}^{n}(k_i+1)$$

since also the pair (di; di) is included. The number of neighbours ki (the number of pairs) is different for every detection even within one mini-batch. To reduce the variable sized neighbourhood into a fixed size representation, the architecture of the present disclosure uses global max-pooling over all detection pairs that belong to the same detection (K×I→n×l), after which normal fully connected layers can be used to update the detection representation (see FIG. 3).

Detection Pair Features:

The features for each detection pair used in the detection context consists of several properties of a detection pair: (1) the intersection over union (IoU), (2-4) the normalised distance in x and y direction and the normalised 12 distance (normalized by the average of width and height of the detection), (4-5) scale difference of width and height (e.g. log (wi=wj)), (6) aspect ratio difference log (ai=aj), (7-8) the detection scores of both detections. In the multi-class setup, each detection provides a scores vector instead of a scalar thus increasing the number of pair features. All these raw features are fed into 3 fully connected layers, to learn the g detection pair features that are used in each block.

Figure 3:
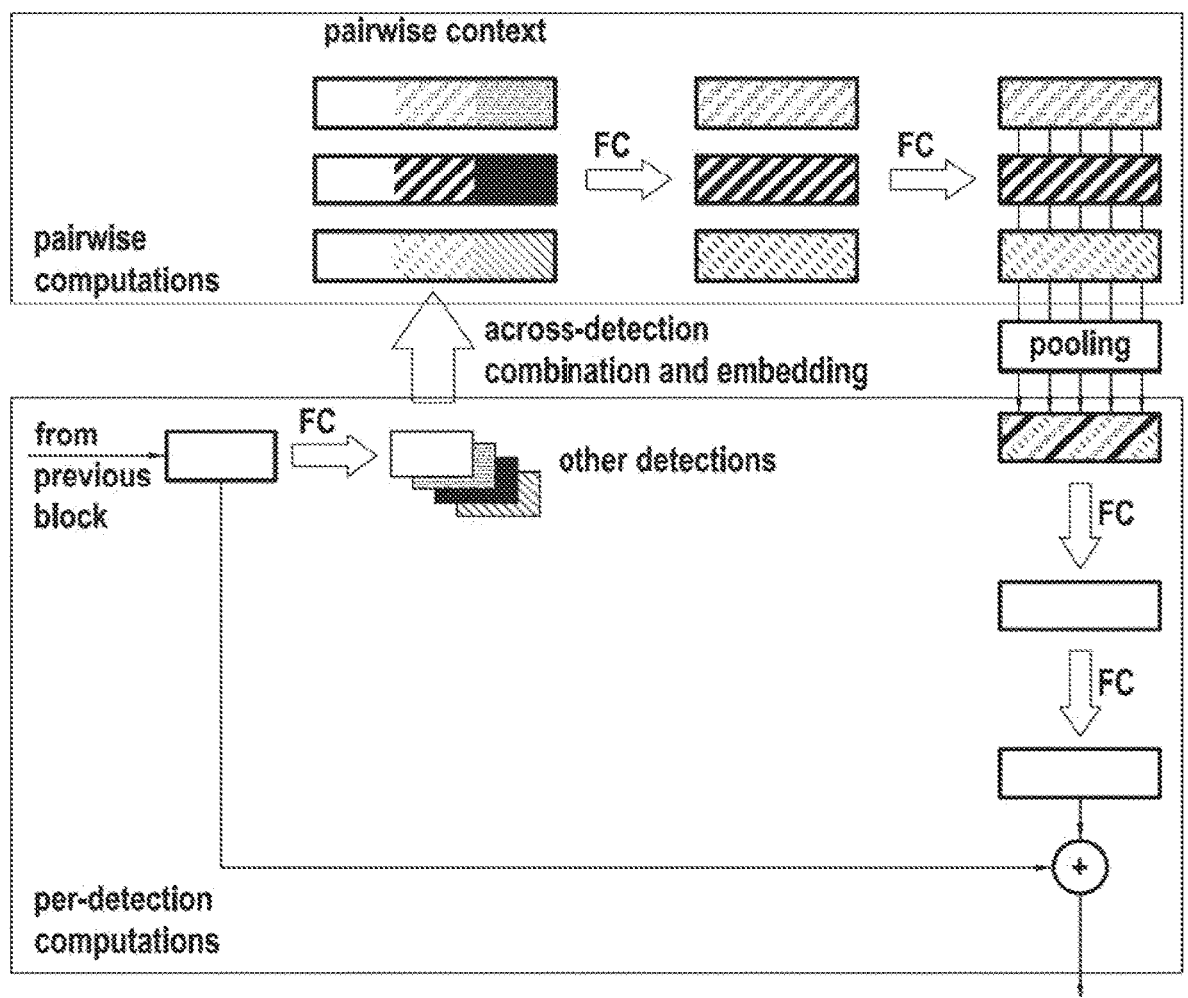
FIG. 3 shows a schematic flow chart illustrating the operation of the rescoring system, in particular a neural network for the rescoring procedure according to embodiments of the present disclosure.

Block:

A block does one iteration allowing detections to look at their respective neighbours and updating their representation, as shown in FIG. 3. FIG. 3 shows a schematic flow chart illustrating the operation of the rescoring system, in particular a neural network for the updating procedure according to embodiments of the present disclosure. One block of the neural network of the present disclosure is shown here for one detection. The representation of each detection is reduced and then combined into neighbouring detection pairs and concatenated with detection pair features (hatched boxes, corresponding features and detections have the same pattern). Features of detection pairs are mapped independently through fully connected layers. The variable number of pairs is reduced to a fixed-size representation by max-pooling. Pairwise computations are done for each detection independently.

In particular, the neural network consists of a dimensionality reduction, a pairwise detection context layer, 2 fully connected layers applied to each pair independently, pooling across detections, and two fully connected layers, where the last one increases dimensionality again. The input and output of a block are added as in the Resnet architecture, cf.:

K. He, X. Zhang, S. Ren, and J. Sun. Identity mappings in deep residual networks. In ECCV, 2016

The first block receives zero features as inputs, so all information that is used to make the decision is bootstrapped from the detection pair features. The output of the last block is used by three fully connected layers to predict a new score for each detection independently (cf. FIG. 4a, 4b).

FIG. 4a shows a schematic flow chart illustrating a training architecture of the neural network according to embodiments of the present disclosure; and FIG. 4b shows a schematic flow chart illustrating a test architecture of the neural network according to embodiments of the present disclosure. FIGS. 4a and 4b are understood to be high level diagram of the disclosure. In the training architecture of FIG. 4a blocks are, as described in FIG. 3. "FC" denotes fully connected layers. All features in this diagram may have 128 dimensions (input vector and features between the layers/blocks). The output is a scalar.

Parameters:

The neural networks may have 16 blocks. The feature dimension for the detection features may be 128 and may be reduced to 32 before building the pairwise detection context. The detection pair features may also have 32 dimensions. The fully connected layers after the last block may output 128 dimensional features. When the feature dimension is changed, the ratio between the number of features in each layer is kept constant, so indicating the detection feature dimension is sufficient.

Message Passing:

The forward pass over several stacked blocks can be interpreted as message passing. Every detection sends messages to all of its neighbours in order to negotiate which detection is assigned an object and which detections should decrease their scores. Instead of handcrafting the message passing algorithm and its rules, the network is configured to latently learn the messages that are being passed.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A system for detecting objects in a digital image, the system comprising a neural network being configured to:
generate candidate windows indicating object locations, and
for each candidate window generate a score representing the confidence of detection,
wherein generating the scores comprises:
generating a latent representation for each candidate window,
updating the latent representation of each candidate window based on the latent representation of neighboring candidate windows, and
generating the score for each candidate window based on its updated latent representation.

2. The system according to claim 1, wherein the latent representations are updated such that the resulting scores of the candidate windows are changed.

3. The system according to claim 1, wherein updating the latent representation of a candidate window is performed by considering pairs of neighboring candidate windows, a pair of neighboring candidate windows comprising said candidate window and one of its neighboring candidate windows.

4. The system according to claim 1, wherein the neighboring candidate windows comprise all windows overlapping to a predetermined extent with the candidate window, of which the latent representation is updated.

5. The system according to claim 1, wherein the neural network comprises a repeating structure for updating the latent representation of each candidate window based on the latent representation of neighboring candidate windows.

6. The system according to claim 1, wherein updating the latent representation of a candidate window comprises forming with each of its neighboring candidate windows a pair of detections,
the pair of detections including the latent representations of said candidate window and said neighboring window,
the pair of detections being a pair feature vector.

7. The system according to claim 6, wherein updating the latent representation of a candidate window further comprises determining detection pair features based on the two candidate windows, in particular the geometry of the candidate windows,
the detection pair features of the pair of candidate windows are concatenated to the pair feature vector.

8. The system according to claim 6, wherein the pair feature vector, to which the detection pair features are concatenated, is mapped independently through fully connected layers.

9. The system according to claim 6, wherein the number of pair feature vectors corresponding to the variable number of neighboring candidate windows is reduced to a fixed-size representation by pooling, wherein the pair feature vectors are reduced with an elementwise operation to one n-dimensional pooling feature vector.

10. The system according to claim 9, wherein the dimensionalities of the latent representations of candidate windows are reduced before being combined into the pair feature vector, and/or
after the pooling operation the dimensionalities are increased to match the size of the latent representations of candidate windows.

11. The system according to claim 1, wherein a candidate window comprises a rectangular frame and/or a pixelwise mask of a detected object.

12. The system according to claim 1, wherein the neural network is trained by using at least one digital training image as a ground truth having a plurality of objects and respective object annotations indicating the actual locations of the objects, the training comprising:
generating candidate windows indicating object locations,
for each candidate window generating a score representing the confidence of detection, and
associating each object annotation to the best matching candidate window based on the score of the candidate windows and the overlap between the object annotation and the candidate windows, so that each candidate window is associated to maximally one object annotation and so that each object annotation is associated to maximally one candidate window.

13. The system according to claim 12, wherein the neural network is trained by using successfully matched detections as positive training examples, and unmatched detections as negative training examples.

14. A system for rescoring object detections in a digital image, wherein an object detection comprises a candidate window indicating the object location and a score representing the confidence of detection,
the system comprising a neural network being configured to:
generate a latent representation for each object detection,
update the latent representation of each object detection based on the latent representation of neighboring object detections, and
generate the new score for each object detection based on its updated latent representation.

15. A method of detecting objects in a digital image,
a neural network performs the steps of:
generating candidate windows indicating object locations, and
for each candidate window generating a score representing the confidence of detection,
wherein the step of generating the scores comprises:
generating a latent representation for each candidate window,
updating the latent representation of each candidate window based on the latent representation of neighboring candidate windows, and
generating the score for each candidate window based on its updated latent representation.

16. A method of rescoring object detections in a digital image, wherein an object detection comprises a candidate window indicating the object location and a score representing the confidence of detection, wherein
a neural network performs the steps of:
generating a latent representation for each object detection,
updating the latent representation of each object detection based on the latent representation of neighboring object detections, and
generating the new score for each object detection based on its updated latent representation.

17. A non-transitory computer readable medium configured for executing the steps of the method according to claim 15 when the non-transitory computer readable medium is executed by a computer.

18. The system according to claim 1, wherein the candidate windows are in the form of a set of boxes.

19. The system according to claim 18, wherein there is one box per object in the image.

* * * * *